Patented Mar. 8, 1938

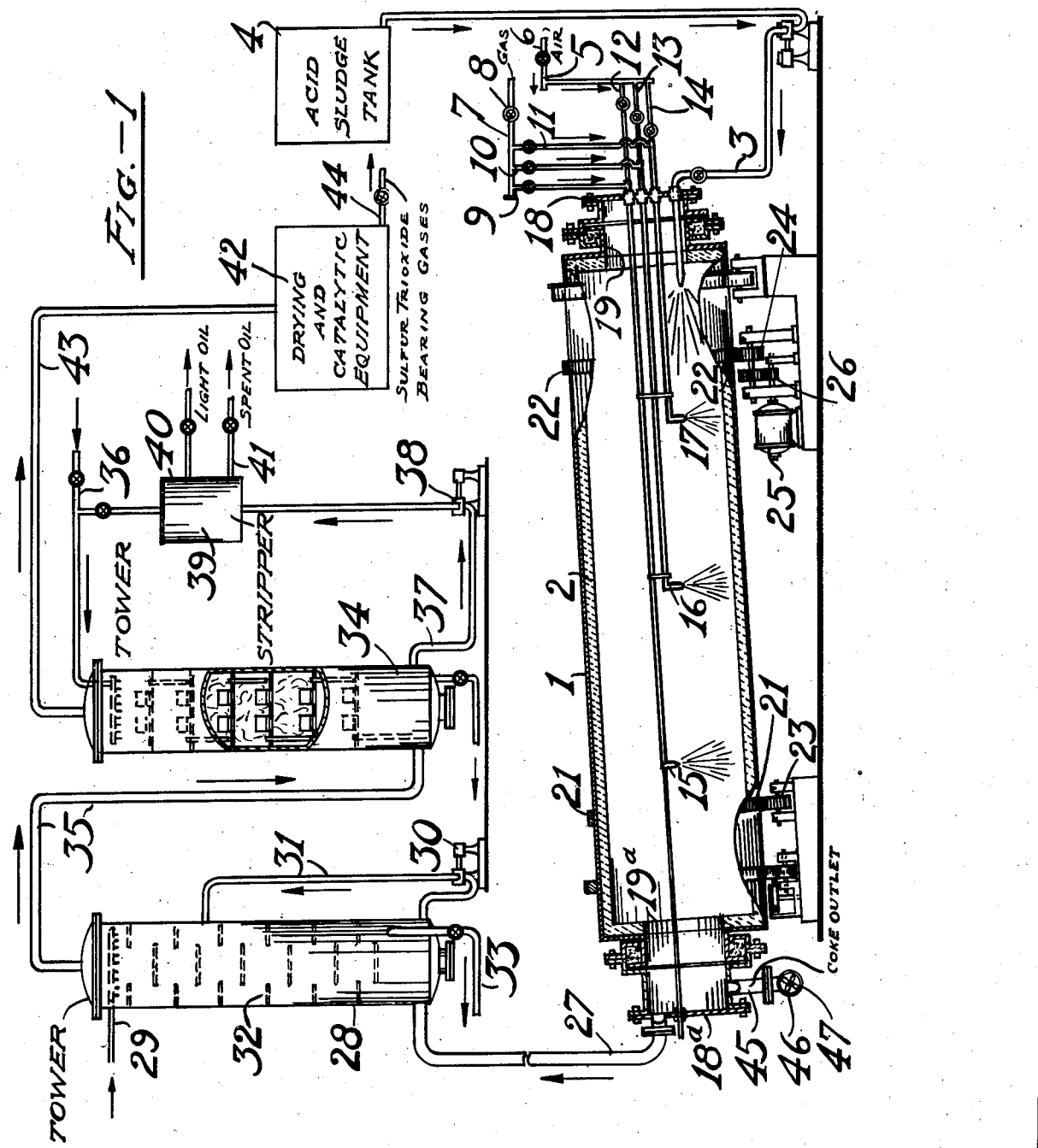

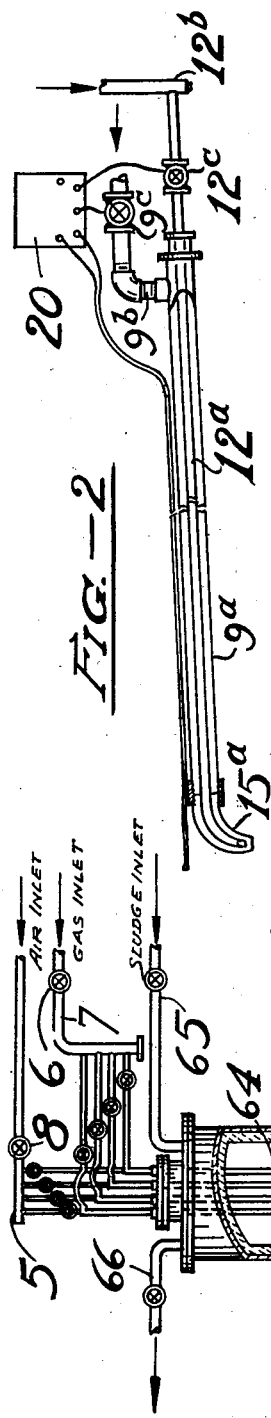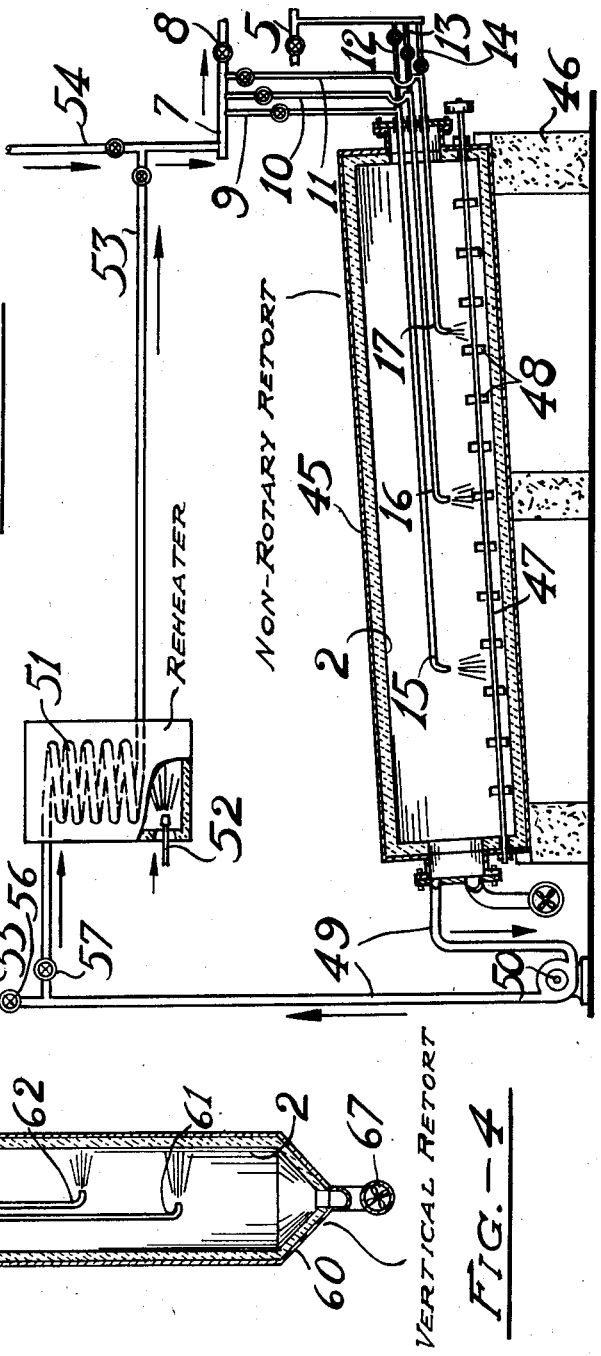

2,110,267

UNITED STATES PATENT OFFICE 2,110,267

METHOD OF MAKING SULPHURIC ACID FROM WASTE MATERIALS

Paul J. Harrington, Westfield, and Harry G. Burks, Jr., Elizabeth, N. J., assignors to Standard Oil Development Company, a corporation of Delaware Application October 7, 1933, Serial No. 692,590

3 Claims. (Cl. 23—177)

This invention relates to improvements in the manufacture of sulphur dioxid, sulphur trioxid, sulphuric acid and the like, from sulphur or sulphur compounds contained in waste materials, especially from sulphuric acid in the sludge derived from the refining of hydrocarbon oils with that acid. Petroleum acid sludges are produced in great quantities. They are a potential source of sufficient sulphuric acid to satisfy a large part of the refineries' requirements, but the difficulty of handling the sludges often causes them to be regarded as merely obnoxious waste materials, adapted at best only for use as low grade fuel. They often raise serious problems of disposal.

A principal object of the invention is to provide a decomposition method for the efficient disposal of acid sludges, while at the same time preparing a good grade of concentrated or fuming sulphuric acid, or other useful sulphur derivatives, and conserving the fuel value of the sludge. Several types of equipment which may be advantageously used in carrying out the process also form a part of the invention, but this is not necessarily limited to the forms of apparatus shown. In general, the principle of operation is the concurrent flow of the acid sludge with a current of high temperature gas, preferably oxygen, air or other oxygen-containing gas, with or without combustible gases or other fuel. The reaction is carried out under conditions to convert at least part of the carbonaceous matter of the sludge into coke or semi-coke and to reduce the sulphuric acid to sulphur dioxid. The oxygen-containing gas is supplied in increments to the charge of sludge as it proceeds through the reaction vessel.

Many processes of handling acid sludge have been suggested, including some in which the sulphuric acid of the sludge is converted into sulphur dioxid by concurrent flow of the sludge with hot oxidizing gas, followed by the catalytic conversion of the resulting sulphur dioxid into sulphur trioxid. In the present invention, the incremental addition of the oxidizing gas makes possible the full utilization of the fuel value of the sludge (including usually the avoidance of outside separate generation of hot gases) and the heat is controlled more accurately than has heretofore been possible.

The invention will be fully understood from the following description, read in connection with the accompanying drawings, in which Fig. 1 is a side elevation, partly in section, of apparatus in which the sludge is fed through a rotary retort;

Fig. 2 is a detail sectional view showing a preferred form of air and fuel inlet to the retort;

Fig. 3 is a fragmentary side elevation, partly in section, of an installation using recirculation of gas through a non-rotary retort and showing also agitating means in the retort; and Fig. 4 is a similar view of a vertical retort.

Referring first to Fig. 1, reference numeral 1 designates a tubular retort, for example about thirty feet in length and mounted for rotation. The retort preferably has insulating and refractory material 2 covering its inner walls. Acid sludge to be treated is supplied to the retort at its upper end through a conduit 3 from supply tank 4. Oxygen-containing gas (generally air) is supplied in any suitable manner through a header 5 in which there is a valve 6. A header 7, in which there is a valve 8, serves for the admission of combustible gas. Branch lines 9, 10, 11 and 12, 13, 14, connect the headers 5 and 7 respectively with the distributor nozzles 15, 16 and 17 in the retort. Valves are provided in the branch lines so that the proportions of air and combustible gas can be adjusted as desired. The air-fuel lines extend through a fixed head 18 on the end of the retort. This head engages a neck 19 and the neck is freely rotatable in the head. Suitable gaskets and securing means are provided in the well-known manner to make the joints fluid tight.

The preferred form of nozzle is illustrated in Fig. 2 in which 15a denotes the nozzle itself, 9a the outer pipe which receives fuel gas from branch line 9b, and 12a the inner pipe which receives oxygen-containing gas from branch line 12b. The valves 9c and 12c in these branch lines are preferably automatically operated by a pyrometer and motor hook-up as indicated by 20. The same nozzle may be used when high temperature gas is used without combustion. In that case one of the pipes 9a, 12a may be closed. Other forms of nozzle and supply pipes may be adopted, provided they meet the essential conditions of supplying the gases to the retort at properly spaced points and at the desired temperature.

Retort 1 is mounted for rotation in any suitable way, as by the gear-toothed bands 21 and 22 meshing with gears 23 and 24. The driving force is supplied for example by a motor 25 through reduction gears 26.

The gaseous and vaporous product of reaction in retort 1 is discharged through line 27 into a tower 28 supplied with cooling water at the top through line 29. A portion of the water may be recirculated through pump 30 and connection 31. The tower has baffles 32 or other suitable contact means. The connection of the line 27 with the retort is through a joint 18a, 18a as described above.

When a petroleum acid sludge and air are the reactants, the gaseous and vaporous product will be in the main sulphur dioxid, steam, carbon dioxid, oil, and nitrogen. Most of the steam and heavy oil are condensed in tower 28. The condensate is withdrawn through line 33. The residual gas may contain traces of oil or other impurities and is therefore best further treated, as by scrubbing with oil in tower 34 to which the gas is conveyed by line 35. The oil used is preferably heavy gas oil or the like. It is supplied through line 36 and withdrawn through line 37 by pump 38 to the stripper 39. From this the stripped oil passes back to the tower 34. Light oils are removed from the stripper by line 40. Spent oil is drawn off through line 41 when desirable.

The purified sulphur dioxid and accompanying nitrogen or other non-reactive gas are passed into the conversion stage, indicated diagrammatically by 42, through a line 43. Although the invention is not restricted to any particular form of conversion, the vanadium pentoxide catalyst method is recommended. This is well known in the art. The sulphur trioxid produced is withdrawn through line 44 for the manufacture of fuming sulphuric acid, or acid of any other desired concentration. It will be understood that sulphur dioxid may be recovered as such or converted into other products than sulphuric acid.

The solid or semi-solid product of the reaction in retort 1 is withdrawn through a conduit 45 connected to head 18a and discharging into a chamber 46 in which a screw conveyor 47 works. The coke withdrawal system is kept closed against escape of gas as by actuation of slide valves in the well-known manner. The retort may be run to give various qualities of coke or coky material, ranging from a semi-coke which is the carbonaceous matter of the sludge without great modification, to dry, granular carbon. The material produced may be handled conveniently. The elimination of most of the sulphur content as sulphur dioxid avoids one objection to the use of acid sludge as a fuel and the form of the carbonaceous product is much better adapted for fuel than the original sludge.

The usual charge material for the process is a white oil sludge, such as is obtained in the refining of petroleum oils for the manufacture of heavy medicinal oils and the like. Such sludges ordinarily yield on heating about 24% water, 40% solid carbonaceous or coky matter, 1 to 2% oil and about 33% sulphur dioxid combined as sulphuric acid and other sulphur compounds. Another typical material to be treated is naphtha sludge which has a lower acid content. This type of sludge also has a higher oil content than white oil sludge. Sludge acids, acid oils, and other waste sulphuric products may also be treated. The gaseous product obtained is ordinarily sulphur dioxid carried by a substantially larger volume of combustion products and nitrogen. However, by using a recirculation method, such as will be described, it is possible to raise the sulphur dioxid content to any desired value, even as much as 80 or 90%.

In order to obtain the desired reaction in the retort 1, it is necessary to make sure that the oxygen content is not too great. A large excess of oxygen will result in the production of sulphur trioxid, which will seriously disturb the operation of the catalytic converter. On the other hand, there must be enough oxygen present to support the combustion of sludge material (or added combustible) so that the temperature in the retort will be sufficiently high. Most of the sulphuric acid, in an efficient operation, must be reduced to sulphur dioxid by heat and in the presence of carbonaceous material. A proper balance between these two extremes can be readily obtained by adjusting the valves in the air and fuel lines 9, 10, 11 and 12, 13, 14.

In starting the operation, it is necessary to use an excess of oxygen, and to add combustible gas or other fuel, to heat the retort and decompose the sludge. As soon as the discharge end of the retort has reached the proper temperature (generally around 1400-1700° F. in the gas space) the oxygen content of the entering gases can be reduced. In some cases it will then be unnecessary to supply combustible gases with the oxygen-containing gas to all the zones of the converter. The coke usually is not heated to above 400-600° F. Pyrometers are placed at numerous intervals along the retort so that the operator can determine the temperature conditions and produce more combustion in any zone which requires additional heating, or reduce combustion in any zones which tend to be overheated. Automatically controlled valves are preferably used, actuated by the retort temperatures.

Referring to Fig. 3, the device illustrated is similar to that shown in Fig. 1, but a non-rotary retort is used and provision is made for the recirculation of gases produced in the retort so as to build up a high concentration of sulphur dioxid in the gases. In this figure, reference numeral 45 indicates the retort which is mounted on a suitable setting 46. The stirrer or agitating device 47 extends longitudinally through the retort and has arms 48 which are so arranged as to scrape off the deposits of coke or coke-like material which may tend to form on the walls. The arrangement for introducing the air, with or without combustible gas, may be the same as is shown in Figs. 1 and 2.

The gaseous reaction product is withdrawn through a line 49 which leads through a blower 50 into a reheater 51, heated by burner 52. From the reheater a line 53 is extended to connect with the inlet line 54 which supplies the air to the distributor pipes.

There is a drawoff line 55 connected to the line 49 and through this drawoff line some or all of the gaseous product of reaction in retort 45 may be withdrawn. Valves 56 and 57 permit the operator to control the flow of gases through these lines. By the arrangement described it is possible to secure any desired concentration of sulphur dioxid in the gas passing from the retort to the catalytic converting chamber or other place of disposal. In order to vent the system a pipe 58 controlled by valve 59 is provided at a suitable point, for instance on the line 55.

It will be noted that the present invention does not require the use of a furnace to develop gases at extremely high temperatures. If all the heat required for converting the sulphuric acid to sulphur dioxid were supplied from an external source in the form of hot gases, those gases would have to be at a temperature very close to 2000° F. Furnaces for generating gases at this temperature are costly and require frequent repairs. In the present method the required heat is produced by direct combustion in the sludge itself. For the most part the fuel is the carbonaceous matter of the sludge, only such additional combustible being added as is required by special circumstances.

Although in the foregoing description reference has been made to rotating retorts or retorts which are provided with agitating devices, in some cases it is possible to operate with a degree of satisfaction by simply passing the acid sludge and the oxidizing gas concurrently through a non-rotary, nonagitated retort, for example, a vertical retort 60, as shown in Fig. 4. In this figure the nozzles 61, 62, 63, 64 are provided. The acid sludge or other sulphur-containing waste material is fed in through line 65. The sulphur dioxid is removed through line 66 and the coke by conveyor 67. The recovery system is as described.

For some purposes it is satisfactory to expel a part only of the sulphur dioxid and this can be done without coking the sludge.

In the preferred method of operation a rotary or stirred retort is used and the oxygen-containing gas is supplied so that near the inlet of the retort there will be some combustion but no high temperature development. In the intermediate zone the quantity of oxygen should be such as to effect combustion of the oil vapors generated in the retort. In the final stage approaching the outlet of the retort there should be a small excess of oxygen. If there is too much oxygen, the tendency to form sulphur trioxid is pronounced, and this is to be avoided, since it disturbs the operation of the catalytic converter. On the other hand, some oxygen is required to prevent the formation of hydrogen sulphide.

It is not possible to state exactly what temperatures should prevail in the various sections of the retort, as these temperatures will vary with the particular sludge and the desired extent of decomposition. By way of example, however, when treating white oil sludge we prefer to maintain a temperature of about 1600° F. in the outlet end of the retort, 1400° F. in the intermediate section and 500° F. in the inlet section. In general the temperature should rise progressively toward the outlet. Operation at substantially atmospheric pressure is in general satisfactory but pressures higher or lower than atmospheric may be used if special circumstances require them.

It will be understood that stirring or agitating means may be used in a rotating retort. Also, recirculation of the sulphur dioxid gas may be adopted in the devices of Figs. 1 and 4. When high temperature non-oxidizing (or substantially non-oxidizing) gas is used, it will be supplied at temperatures sufficiently high to maintain the required retort temperatures without internal combustion. However, it is preferred, as noted above, to derive all or most of the heat from the burning of the sludge itself.

Various changes and alternative arrangements may be made within the scope of the appended claims, in which it is our intention to claim all novelty inherent in the invention, as broadly as the prior art permits.

We claim:

1. Method of producing sulphuric acid from petroleum acid sludge, comprising passing the sludge concurrently with hot oxidizing gas through a reaction zone, introducing such gas into the first stage of the reaction zone to produce a moderate temperature therein, introducing such gas with a greater quantity of oxygen into an intermediate stage of the reaction zone to produce a high temperature therein to cause liberation of sulphur dioxid, introducing into the last stage of the reaction zone a gas containing only a small amount of oxygen in excess of that which will be consumed, withdrawing the gaseous reaction product containing sulphur dioxid, and converting the sulphur dioxid into sulphuric acid.

2. Method of producing sulphuric acid from petroleum acid sludge, comprising passing the sludge through a retort, introducing into the retort, at a point adjacent the point of entry of the sludge, a stream of an oxidizing gas, projecting another increment of said gas stream into the sludge at an intermediate stage to further heat the sludge to a decomposition temperature, and projecting a third increment of such gas in a final stage of the passage through the retort, taking off the non-reactive gases and the sulphur dioxid produced by the reaction together with oil vapors and steam, condensing the oil vapors and steam, and passing the residual sulphur dioxid and non-reactive gases to a catalytic conversion zone.

3. Method according to claim 2, in which the gaseous product of the reaction is recirculated at least in part through the retort, whereby a concentration of sulphur dioxid is obtained adapted for ready conversion to sulphur trioxid in the catalytic stage.

PAUL J. HARRINGTON.
HARRY G. BURKS, Jr.